US009477540B2

(12) United States Patent
Antonakopoulos et al.

(10) Patent No.: US 9,477,540 B2
(45) Date of Patent: Oct. 25, 2016

(54) MULTI-STAGE CODEWORD DETECTOR (71) Applicant: GLOBALFOUNDRIES INC., Grand Cayman (KY)

(72) Inventors: Theodore Antonakopoulos, Rio Patras (GR); Thomas Mittelholzer, Rueschlikon (CH); Nikolaos Papandreou, Rueschlikon (CH); Charalampos Pozidis, Rueschlikon (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 134 days.

(21) Appl. No.: 14/496,273

(22) Filed: Sep. 25, 2014

(65) Prior Publication Data
US 2015/0149816 A1 May 28, 2015

(30) Foreign Application Priority Data
Nov. 28, 2013 (GB) .................. 1320982.0

(51) Int. Cl.
*G11C 29/00* (2006.01)
*G06F 11/07* (2006.01)
*G06F 3/06* (2006.01)
*G06F 11/00* (2006.01)
*H04L 1/00* (2006.01)

(52) U.S. Cl.
CPC .............. *G06F 11/073* (2013.01); *G06F 3/06* (2013.01); *G06F 11/008* (2013.01); *G06F 11/076* (2013.01); *H04L 1/0045* (2013.01)

(58) Field of Classification Search
CPC ........... G06F 11/1004; G06F 11/1072; G06F 11/1012; G06F 11/141; G06F 11/1068; G06F 11/1044; G11C 7/1006; G11C 16/26; G11C 11/5642; G11C 16/10; G11C 29/00; G11C 11/5678; G11C 2211/563; G11C 2211/5634; G11C 11/1068; G11C 11/5621; G11C 11/5692; H03M 13/11
See application file for complete search history.

(56) References Cited

U.S. PATENT DOCUMENTS 7,721,185 B1 * 5/2010 Feng ................. H03M 13/1515
714/784
7,814,401 B2 10/2010 Alrod et al.
(Continued)

FOREIGN PATENT DOCUMENTS

WO 2008121553 A1 10/2008
WO 2013046066 A1 4/2013

OTHER PUBLICATIONS

B. Ricco, et al., "Nonvolatile Multilevel Memories for Digital Applications," Proceedings of the IEEE, vol. 86, No. 12, Dec. 1998, pp. 2399-2421.
(Continued)

*Primary Examiner* — Guerrier Merant
(74) *Attorney, Agent, or Firm* — Hoffman Warnick LLC (57) ABSTRACT

A multi-stage codeword detector for detecting codewords from read signals received from a multi-level memory device, includes a first detection stage configured for a coarse detection of a first codeword from a received read signal; a second detection stage configured for a fine detection of a second codeword from the received read signal; and a deciding entity configured to decide on using the second detection stage for the received read signal in dependence on a reliability indicator indicating a certain reliability level of the received read signal.

18 Claims, 5 Drawing Sheets

(56) References Cited

U.S. PATENT DOCUMENTS

| | | | |
|---|---|---|---|
| 7,907,444 B2 | 3/2011 | Sarin et al. | |
| 8,145,984 B2 | 3/2012 | Sommer et al. | |
| 8,156,403 B2 | 4/2012 | Shalvi et al. | |
| 8,289,781 B2 | 10/2012 | Litsyn et al. | |
| 8,369,141 B2 | 2/2013 | Sommer et al. | |
| 8,429,498 B1* | 4/2013 | Anholt | G06F 11/1048 365/227 |
| 8,627,188 B2* | 1/2014 | Weingarten | G06F 11/1068 365/185.09 |
| 2002/0095639 A1* | 7/2002 | Ahmed | H03M 13/00 714/786 |
| 2009/0158128 A1* | 6/2009 | Yokokawa | H03M 13/15 714/780 |
| 2009/0177931 A1 | 7/2009 | Song et al. | |
| 2010/0199149 A1* | 8/2010 | Weingarten | G06F 11/1068 714/773 |
| 2011/0161775 A1 | 6/2011 | Weingarten | |
| 2012/0320672 A1 | 12/2012 | Meir et al. | |
| 2013/0086457 A1 | 4/2013 | Mittelholzer et al. | |
| 2013/0173985 A1 | 7/2013 | Chung et al. | |
| 2014/0181618 A1* | 6/2014 | Wu | H03M 13/11 714/761 |

OTHER PUBLICATIONS

D. Lelmini, et al., "Resistance-dependent amplitude of random telegraph-signal noise in resistive switching memories," AIP Applied Physics Letters, 96, 2010, pp. 1-4.

F. Sala, et al., "Dynamic Threshold Schemes for Multi-Level Non-Volatile Memories," Conference Record of the Forty Sixth Asilomar Conference on Signals, Systems and Computers (ASILOMAR), Nov. 2012, pp. 1245-1249.

G. Dong, et al., "On the Use of Soft-Decision Error-Correction Codes in NAND Flash Memory," IEEE Transactions on Circuits and Systems-I: Regular Papers, vol. 58, No. 2, Feb. 2011, pp. 429-439.

H. Wong, et al., "Phase Change Memory," Invited Paper, Proceedings of the IEEE, vol. 98, No. 12, Dec. 2010, pp. 2201-2227.

IPO UK Search Report; Application No. GB1320982.0; Patents Act 1977: Search Report Under Section 17(5); Date Mailed: May 28, 2014, pp. 1-4.

N. Papandreou, et al., "Drift-Tolerant Multilevel Phase-Change Memory," 3rd IEEE International Memory Workshop (IMW), May 22-25, 2011, pp. 1-4.

Q. Wu, et al., "Using Multilevel Phase Change Memory to Build Data Storage: A Time-Aware System Design Perspective," IEEE Transactions on Computers, vol. 62, No. 10, Oct. 2013, pp. 2083-2095.

W. Chien, et al., "A Multi-Level 40nm WOx Resistive Memory with Excellent Reliability," IEEE International Electron Devices Meeting (IEDM), Dec. 5-7, 2011, pp. 1-4.

Y. Cai, et al. "Threshold Voltage Distribution in MLC NAND Flash Memory: Characterization, Analysis, and Modeling," Proceedings of the Conference on Design (EDAA), Mar. 2013, pp. 1-6.

* cited by examiner

MULTI-STAGE CODEWORD DETECTOR

FOREIGN PRIORITY

This application claims priority to Great Britain Patent Application No. 1320982.0, filed Nov. 28, 2013, and all the benefits accruing therefrom under 35 U.S.C. §119, the contents of which in its entirety are herein incorporated by reference.

BACKGROUND

The invention relates to a multi-stage codeword detector for detecting codewords from read signals received from a multi-level memory device and to a memory system including a multi-level memory device and such a multi-stage codeword detector. Further, the invention relates to a method for operating a multi-stage codeword detector and to a computer program for executing such a method. Particularly, the multi-level memory device includes multi-level cells (MLC) having a plurality of programmable levels.

A prominent example for MLC memory cells having a plurality of programmable levels is Resistive Random Access Memory (RRAM; see reference [3]), particular Phase Change Memory (PCM; see reference [2]), or Flash (see reference [1]). PCM is a non-volatile solid-state memory technology that exploits a reversible, thermally-assisted switching of specific chalcogenides between certain states of different electrical conductivity.

PCM is a promising and advanced emerging non-volatile memory technology mainly due to its excellent features including low latency, high endurance, long retention and high scalability. PCM may be considered a prime candidate for Flash replacement, embedded/hybrid memory and storage-class memory. Key requirements for competitiveness of PCM technology may be multi-level cell functionality, in particular for low cost per bit, and high-speed read/write operations, in particular for high bandwidth. Multilevel functionality, i.e., multiple bits per PCM cell, may be a way to increase storage capacity and thereby to reduce cost.

Multi-level PCM is based on storing multiple resistance levels between a lowest (SET) and a highest (RESET) resistance value. Multiple resistance levels or levels correspond to partial-amorphous and partial-crystalline phase distributions of the PCM cell. Phase transformation, i.e., memory programming, may be enabled by Joule heating. In this regard, Joule heating may be controlled by a programming current or voltage pulse. Storing multiple resistance levels in a PCM cell is a challenging task.

In MLC PCM, the physical quantity measured during cell readout, i.e., the electrical resistance drifts upwards with time following a deterministic empirical power-law with stochastic fluctuations. In MLC Flash, the physical quantity measured is the transistor's threshold voltage, which in turn increases with the number of program/erase cycles. Moreover, in solid-state memory technologies, the read signal is hampered by noise having RTN signature and 1/f characteristics (see reference [4]). In order to increase the reliability of such devices, it may be necessary to use advanced signal processing and/or coding techniques that allow the estimation and detection of the stored information levels (see references [5]-[7]). These types of signal processing functions use as input the soft-information from the readout signal and typically operate on a data-block basis, i.e., on a group of read-out values. The requirement for using advanced signal processing in the read process introduces latency and most probably data overhead which have to be kept at minimum level for solid-state memory applications. In this context, careful design of the memory system architecture may be a key factor to achieve maximum performance with minimum circuit complexity.

On readout of multi-level cells, the read signal level is compared with a set of reference signal levels indicative of the q cell-levels in order to determine which level each cell is set to and thus detect the stored symbol value. However, a problem in multi-level memory devices is that the physical quantity measured during cell readout, such as electrical resistance in PCM devices, may have been changed from its nominal value, i.e., due to noise and/or other physical effects. In particular, the electrical resistance of PCM cells drifts upwards with time in a stochastic manner. This drift can be data-dependent, i.e., may vary for different cell levels. As another example, in flash memory cells the physical quantity measured is the transistor's threshold voltage and this increases with the number of write/erase cycles the cell is subjected to. For any given stored symbol value and hence cell level, therefore, the actual read signal level obtained on cell-readout is variable.

Drift in PCM is a serious problem for multi-level storage in that it severely compromises reliability. The readback values of neighboring levels may interfere over time, due to upward drift of the lower level towards the upper level, causing detection errors. Hence packing higher numbers of levels per memory cell becomes more difficult due to the increased likelihood of error during detection. On the other hand, packing more bits per cell is a crucial requirement for all memory technologies, being the best known way of reducing manufacturing cost per bit. Hence, in situations like this where the read signal level distributions for cell-levels are varying, the reference signal levels used for level detection need to be varied as well, e.g., with time, or with the number of write cycles, etc. Reliable estimation of the reference signal levels is crucial to reliable readback performance.

One approach to the above problem uses training data derived from a pool of reference memory cells for drift estimation. Known information is written to some of these reference cells each time a block of user data is written to memory. These reference cells are then read whenever the user file is read, and the reference cell readings are used to derive estimates for the changing reference signal levels used for detection of the user data. Use of a large amount of this training data significantly reduces storage capacity, while reducing the amount of training data reduces accuracy of level estimation. There is also a penalty in terms of controller complexity and latency due to readout of the extra cells, as well as issues, e.g., wear-leveling issues, related to management of the pool of reference cells. Further, since drift is a statistical phenomenon and there is significant variability between cells in a memory array, reference cells may not be representative and the effectiveness of this approach may vary substantially with time and over different portions of the memory array.

Model-based drift cancellation techniques provide another approach. These seek to model drift based on key parameters such as temperature, time and wear, and compensate accordingly. It is, however, difficult to obtain an accurate cell history for the key parameters. There are also fluctuations from cell to cell and there is no well-established analytical model available for short-term drift.

WO 2013/046066 A1 discloses a drift-resistant technique for read-detection of permutation-based codes in multi-level solid state storage devices SSSDs. The codes in question are length-K, qary-symbol codes, whereby each codeword has K symbols and each symbol can take one of q symbol values. Each symbol is recorded in a respective q-level cell by setting the cell to a level dependent on the qary symbol value. The detection system exploits the property of permutation-based codes that all codewords are permutations of a known set of K-symbol vectors, e.g., the so-called "initial vectors" for a union of permutation codes. Memory cells are read in batches to obtain read signals corresponding to a group of codewords. Each read signal has K signal components corresponding to respective symbols of a codeword, and these components are ordered according to signal level to obtain an ordered read signal for each codeword. Components of these ordered read signals are related to symbols of the known set of initial vectors via a process which involves averaging ordered read signals and relating the averaged signal components to symbol values using predefined probabilities of occurrence of different symbol values at different symbol positions as derived from the initial vectors. This reduces the problem of finding the q drifted reference signal levels to the problem of solving an overdetermined system of K linear equations for the q unknown reference levels.

In this way, estimates are obtained for the reference signal levels for the q-level cells in the current batch, and these reference levels are then used in codeword detection for the batch. Unlike the training-data approach, this is a self-adaptive technique which uses the actual cells storing encoded user data to estimate the reference levels for those cells on readback, thereby accounting for drift effects on a dynamic basis. The technique is also robust and lends itself to simple, fast decoder implementation. However, level-estimation performance can be variable with certain conditions, e.g., depending on the particular code employed, and small batch sizes in particular can adversely affect reliability, especially for "inner" levels of the series of q memory cell levels.

The detection system of WO 2013/046066 A1 comprises two signal processing stages for detecting a respective codeword from a respective received read signal.

Further conventional methods and techniques are described in U.S. Pat. No. 8,289,781 B2, U.S. Pat. No. 7,814,401 B2, U.S. Pat. No. 7,907,444 B2, U.S. Pat. No. 8,156,403 B2, U.S. Pat. No. 8,145,984 B2, U.S. Pat. No. 8,369,141 B2, and U.S. 2013/0086457 A1.

SUMMARY

In one embodiment, a multi-stage codeword detector for detecting codewords from read signals received from a multi-level memory device, includes a first detection stage configured for a coarse detection of a first codeword from a received read signal; a second detection stage configured for a fine detection of a second codeword from the received read signal; and a deciding entity configured to decide on using the second detection stage for the received read signal in dependence on a reliability indicator indicating a certain reliability level of the received read signal.

In another embodiment, a memory system includes a multi-level memory device including a plurality of memory chips configured to store data; and a multi-stage codeword detector configured to detect codewords from read signals received from the multi-level memory device, the a multi-stage codeword detector comprising a first detection stage configured for a coarse detection of a first codeword from a received read signal, a second detection stage configured for a fine detection of a second codeword from the received read signal, and a deciding entity configured to decide on using the second detection stage for the received read signal in dependence on a reliability indicator indicating a certain reliability level of the received read signal.

In another embodiment, a method is disclosed for operating a multi-stage codeword detector for detecting codewords from read signals received from a multi-level memory device, wherein the multi-stage codeword detector includes a first detection stage and a second detection stage. The method includes detecting a first codeword from a received read signal by the first detection stage; deciding on using the second detection stage for the received read signal in dependence on a reliability indicator indicating a certain reliability level of the received read signal; and in the event it is decided to use the second detection stage, detecting a second codeword from the received read signal by the second detection stage.

BRIEF DESCRIPTION OF THE DRAWINGS

Similar or functionally similar elements in the figures have been allocated the same reference signs if not otherwise indicated.

DETAILED DESCRIPTION

In view of the above, embodiments of the present invention provide an improved codeword detector for detecting codewords from read signals received from a multi-level memory device. According to an embodiment of a first aspect, a multi-stage codeword detector for detecting codewords from read signals received from a multi-level memory device is suggested. The multi-stage codeword detector comprises a coarse detection stage, a fine detection stage, and a deciding entity. The first detection stage is configured for a coarse detection of a first codeword from a received read signal. The deciding entity is configured for deciding on using the second detection stage for the received read signal in dependence on a reliability indicator indicating a certain reliability level of the received read signal. The second detection stage is configured for a fine detection of a second codeword from the received read signal.

According to some implementations, the first detection stage may include a first signal processing unit (SPU) for detecting codewords from the received read signal, and the second detection stage may include a second SPU for detecting codewords from the read signal.

Instead of always applying the first SPU and the second SPU, embodiments of the multi-stage codeword detector use the second SPU only when it is necessary. For deciding if it is necessary to use the second SPU, the present multi-stage codeword detector comprises the deciding entity which is configured to decide on using the second SPU (fine detection stage) for the respective received read signal in dependence on the reliability indicator. The reliability indicator indicates a certain reliability level of the respective received read signal. As a result, the reliability indicator indicates if it is necessary to use the second SPU (fine detection stage) or not.

Compared to a scheme with only the first stage SPU for detecting codewords, multi-stage codeword detectors according to embodiments of the invention may provide a decreased error rate.

Compared to a scheme with two SPUs always used in series for detecting a codeword from a received read signal, multi-stage codeword detectors according to embodiments of the invention may reduce the mean processing latency and power. Further, multi-stage codeword detectors according to embodiments of the invention may increase the input data rate.

According to some implementations, the deciding entity includes an error correction or error detection scheme, such as an error correcting code (ECC) or a cyclic redundancy check (CRC). Further, according to some implementations, the certain reliability level may correspond to a defined error rate threshold. In this example, the reliability indicator may correspond to an error rate of the respective received read signal. If the error rate of the received read signal is above the certain error rate threshold, the deciding entity decides to use both, the first detection stage and the fine detection stage. On the other hand, if the error rate is under the defined error rate threshold, the decision entity decides only to use the coarse detection stage.

According to some implementations, the first detection stage is of low complexity. Thus, the first detection stage is faster than the second detection stage for detecting the codewords and provides therefore a lower latency. The second detection stage is of higher complexity than the first detection stage and therefore may provide a higher latency than the coarse detection stage. Further, the second detection stage may provide a decreased error rate compared to the coarse detection stage.

According to some implementations, the first detection stage may be also called coarse detection stage, and the second detection stage may be also called fine detection stage.

In an embodiment, the deciding entity is configured to forward the first codeword after a decoding to an output buffer if the reliability indicator indicates that the reliability level of the received read signal is higher than a certain reliability threshold, and to forward the received read signal to the fine detection stage, if the reliability indicator indicates that the reliability level of the received read signal is less than or equal to the certain reliability threshold.

If the reliability indicator indicates that the reliability level of the respective received read signal is higher than the certain reliability threshold, the first codeword corresponds to the output of the present multi-stage codeword detector. On the other hand, if the reliability indicator indicates that the reliability level of the received read signal is less than or equal to the certain reliability threshold, the second codeword corresponds to the output of the present multi-stage codeword detector.

In a further embodiment, the first detection stage includes a coarse level means estimation unit for a coarse estimation of level means of level signals of the received read signal and a coarse codeword detection unit for providing the first codeword based on the coarse-estimated level means of the signal levels.

In a further embodiment, the coarse level means estimation unit is configured to use least squares or ordered statistics for the coarse estimation of the level means of the signal levels of the received read signal.

In a further embodiment, the coarse codeword detection unit is configured to use a vector-based minimum distance criterion for providing the first codeword based on the coarse-estimated level means of the signal levels of the received read signal.

In a further embodiment, the second detection stage is configured to provide the second codeword from the received read signal using the received read signal and the coarse-estimated level means provided by the coarse level means estimation unit.

The second detection stage may be adapted to provide the second codeword using the received read signal, the coarse-estimated level means and the first codeword.

In a further embodiment, the second detection stage includes a fine level means estimation unit for a fine estimation of level means of the signal levels using vector-based minimum distance detection and a fine codeword detection unit for providing the second codeword based on the fine estimated level means using a vector-based maximum likelihood criterion.

In a further embodiment, the multi-stage codeword detector includes an input buffer for buffering the read signals received from the multi-level memory device. Moreover, the coarse detection stage, the second detection stage and a decoding stage may be coupled between the input buffer and the output buffer.

In a further embodiment, the first detection stage is connected between a first buffer connected to the input buffer and a second buffer connected to the fine detection stage. Furthermore, the first detection stage may include N parallel arranged coarse detection units for coarse detections of N first codewords from N received read signals.

In a further embodiment, the second detection stage is connected between the second buffer and the third buffer connected to the decoding stage. The second detection stage may include M parallel arranged fine detection units for a fine detection of M second codewords from M received read signals.

In a further embodiment, the decoding stage is connected between the third buffer and a fourth buffer connected to the output buffer. The decoding stage may include L parallel arranged decoding units for decoding L codewords into L datawords.

According to some implementations, the first detection stage may comprise N units of a first SPU type. Further, the second detection stage may comprise M units of a second SPU type. Moreover, the decoding stage may comprise L demapper and error detection units (based on ECC or CRC).

N is an integer greater than or equal to 2 ($N \geq 2$), M is an integer greater than or equal to 1 ($M \geq 1$). L is an integer greater than or equal to 1 ($L \geq 1$).

In a further embodiment, the reliability indicator includes a signal processing information indicating a certain noise level of the received read signal, a number of cycles of the multi-level memory device and/or a temperature condition of the memory device. In particular, the signal processing information may include or may be derived from the noise level and/or an error rate of the received read signal.

The present multi-stage codeword detector may be realized as a dedicated CODEC chip. Further, it may be integrated in a memory chip.

Any embodiment of the first aspect may be combined with any embodiment of the first aspect to obtain another embodiment of the first aspect.

According to an embodiment of a second aspect, a memory system is proposed. The memory system includes a multi-level memory device having a plurality of memory chips for storing data. Further, the memory system includes a multi-stage codeword detector of above first aspect for detecting codewords from read signals received from the multi-level memory device.

According to an embodiment of a third aspect, a method for operating a multi-stage codeword detector for detecting codewords from read signals received from a multi-level memory device is suggested. The multi-stage codeword detector includes a first detection stage for a coarse detection of codewords and a second detection stage for fine detection of codewords. In a first operation, a first codeword is detected from a received read signal by the coarse detection stage. In a second operation, it is decided on using the second detection stage for the received read signal in dependence on a reliability indicator indicating a certain reliability level of the received read signal. In a third operation, if it is decided to use the fine detection stage, a second codeword is detected from the received read signal by the fine detection stage.

According to an embodiment of a fourth aspect, the invention relates to a computer program comprising a program code for executing at least one operation of the method of the third aspect for operating a multi-stage codeword detector when run on at least one computer.

Figure 1:
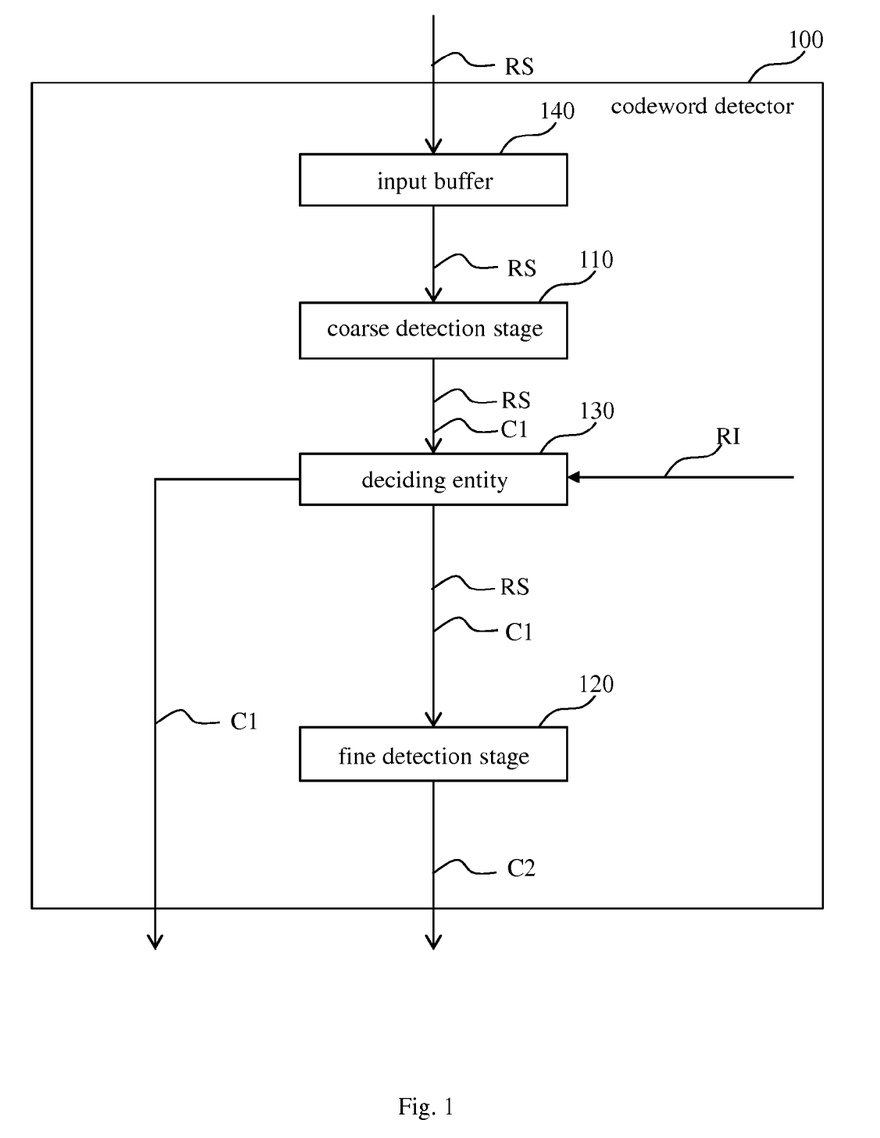
FIG. 1 shows a schematic block diagram of a first embodiment of a multi-stage codeword detector.

Exemplary embodiments of the present invention are described with specific reference to the Figures. Referring initially to FIG. 1, a schematic block diagram of a first embodiment of a multi-stage codeword detector 100 for detecting codewords from read signals RS received from a multi-level memory device 200 (see FIG. 6) is depicted.

The multi-level memory device 200 is adapted to store data in a plurality of memory chips. Each of the memory chips includes a number of memory cells, in particular memory cells having a plurality of programmable levels. Examples for such multi-level memory chips are PCM chips or RRAM chips. The memory chips are grouped into a number of sets. The sets may be also called groups (see reference [8], for example).

The multi-stage codeword detector 100 of FIG. 1 comprises a coarse detection stage 110, a fine detection stage 120, a deciding entity 130, and an input buffer 140 for receiving the read signals RS from the multi-level memory device 200.

The input buffer 140 is coupled to the coarse detection stage 110. The input buffer 140 is adapted to receive read signals RS as from the multi-level memory device 200. A read signal RS may be a codeword block read from the multi-level memory device 200. The block of codewords may be read from the multi-level memory device 200 simultaneously. Further, the input buffer 140 is adapted to provide a received read signal RS to the coupled coarse detection stage 110. The coarse detection stage 110 is configured to detect a first codeword C1 from the received read signal RS. The coarse detection stage 110 may output the detected first codeword C1 and the received read signal RS to the deciding entity 130.

The deciding entity 130 is configured to decide on using the fine detection stage 120 for the received read signal RS in dependence on a reliability indicator RI indicating a certain reliability level of the received read signal RS.

The reliability indicator RI may include a signal processing information indicating a certain noise level of the received read signal RS. For example, the signal processing information may include the noise level of the received read signal RS and/or an error rate of the received read signal RS. Further, the reliability indicator RI may include a number of cycles of the multi-level memory device 200 and/or a temperature condition of the multi-level memory device 200. The cycles are particularly reset/set (or program/erase) cycles of the memory cells of the multi-level memory device 200. The reliability indicator RI may be provided by a decoding unit of the codeword detector 100, by a sensor sensing the temperature of the multi-level memory device 200, by a processor for processing the temperature level of the multi-level memory device 200 and/or by a noise detector detecting the noise of the received read signal RS.

The fine detection stage 120 is configured for a fine detection of a second codeword C2 from the received read signal RS. The second codeword C2 may be also called a fine-detected codeword C2, wherein the first codeword C1 may be also called coarse-detected codeword.

Figure 2:
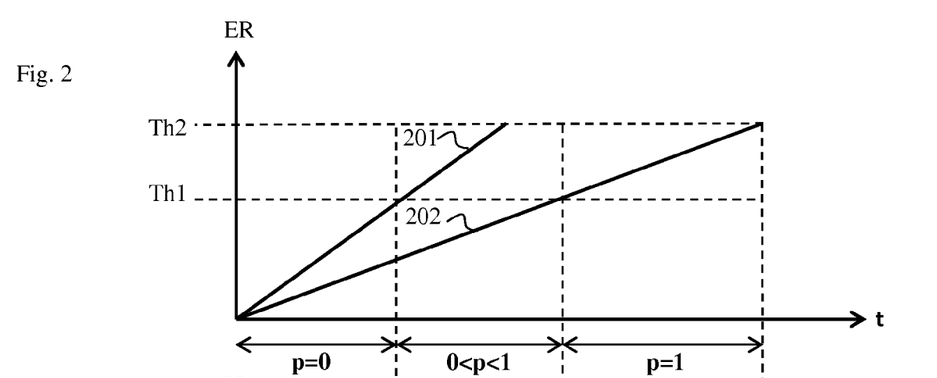
FIG. 2 shows a diagram illustrating the error rate of the multi-stage codeword detector over time.
Figure 3:
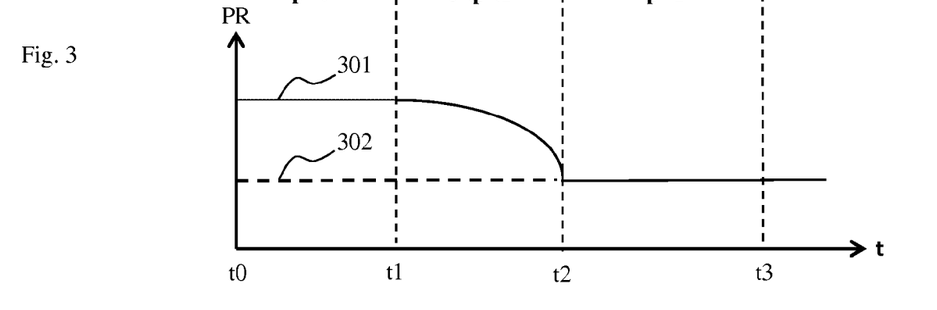
FIG. 3 shows a diagram illustrating the processing rate of the multi-stage codeword detector over time t.

FIG. 2 shows a diagram illustrating the error rate ER of the multi-stage codeword detector 100 over time t, and FIG. 3 shows the processing rate PR of the multi-stage codeword detector 100 over time t. In FIG. 2, Th1 shows an error rate threshold. If the error rate ER of the received read signal is under the error rate threshold Th1, only the coarse detection stage 110 is used. On the other hand, if the error rate ER of the received read signal RS is above the error rate threshold Th1, both the coarse detection stage 110 and the fine detection stage 120 are used. Further, in FIG. 2, curve 201 indicates an error rate of the coarse detecting stage 110, wherein curve 202 indicates the error rate if the coarse detecting stage 110 and the fine detecting stage 120 are used in serious. Moreover, p indicates the probability that the coarse detecting stage 110 and the fine detecting stage are used. Furthermore, Th2 shows an upper error rate threshold.

In the time interval between t1 and t0, the probability p that the fine detection stage 120 is used is null (p=0). In the time interval between t2 and t1, the probability p is between zero and null (0<p<1). Moreover, in the time interval between t3 and t2, the probability p that the fine detecting stage 120 is used is one (p=1).

In FIG. 3, curve 301 shows the processing rate PR for the present multi-stage codeword detector 100. In contrast, curve 302 shows the processing rate PR for a two-stage codeword detector always applying the two stages in series. In the time interval between t2 and t0, curve 301 is above curve 302. As a result, the processing rate PR of the present multi-stage codeword detector 100 is beneficial regarding processing rate and latency.

Figure 4:
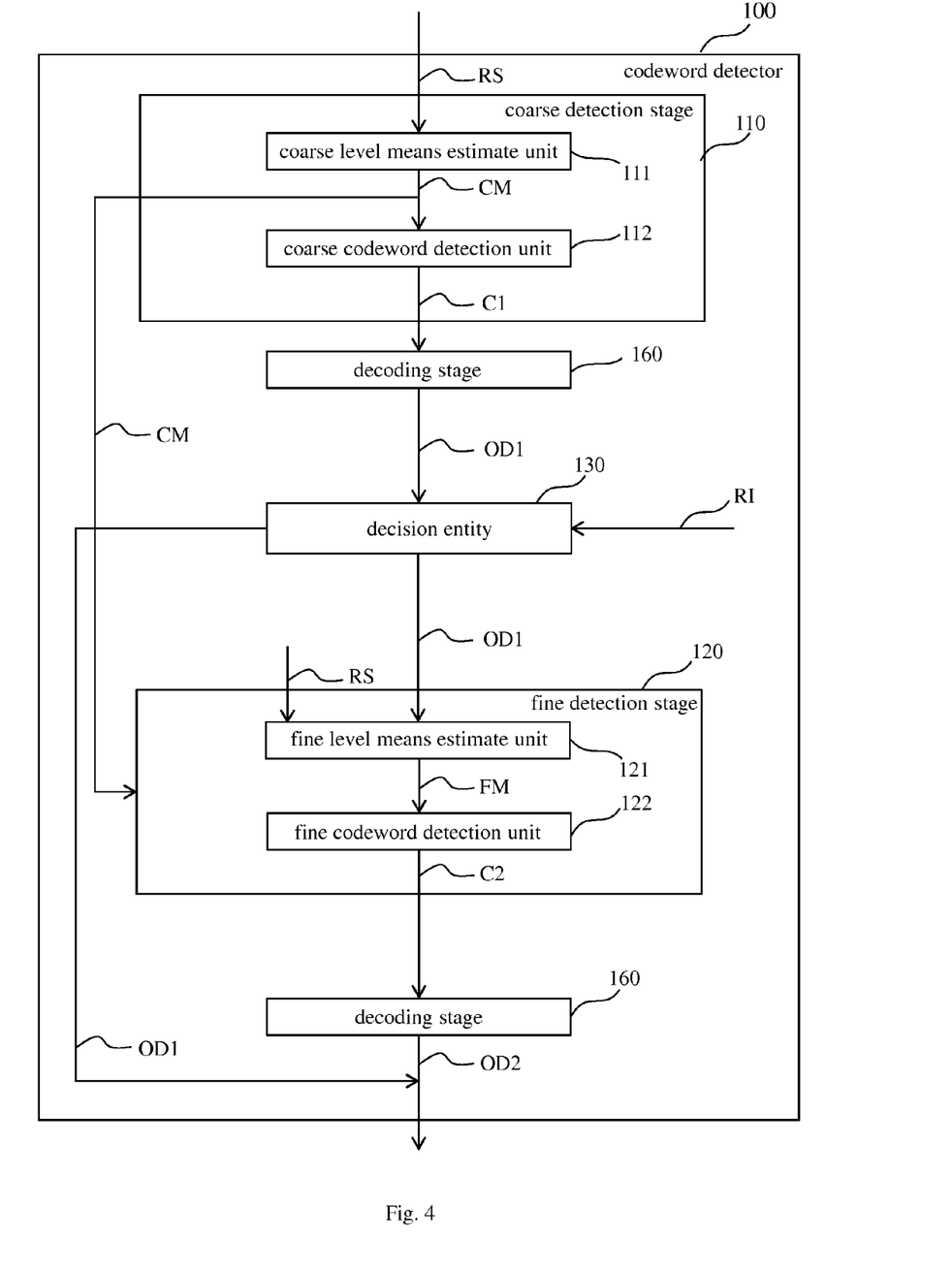
FIG. 4 shows a schematic block diagram of a second embodiment of a multi-stage codeword detector.

In FIG. 4, a schematic block diagram of a second embodiment of a multi-stage codeword detector 100 for detecting codewords from read signals RS received from a multi-level memory device 200 is shown. The embodiment of the multi-stage codeword detector 100 of FIG. 4 includes a coarse detection stage 110, a fine detection stage 120 and a decision entity 130. Input buffer 140 and output buffer 150 are not shown in FIG. 2.

Further, a decoding stage 160 may be coupled to the coarse detection stage 110 and to the fine detection stage 120. Thus, the decoding stage 160 may decode a codeword output by the coarse detection stage 110 and also may decode a codeword output by the detection stage 120.

The coarse detection stage 110 includes a coarse level means estimation unit 111 for a coarse estimation of level means CM of level signals of the received read signal RS and a coarse codeword detection unit 112 for providing the first codeword C1 based on the coarse-estimated level means CM of the signal levels of the received read signals RS. For example, the coarse level means estimation unit 111 may be configured to use least squares or ordered statistics for the coarse estimation of the level means CM of the signal levels of the received read signal RS.

Moreover, the coarse codeword detection unit 112 may be configured to use a vector-based minimum distance criterion for providing the first codeword C1 based on the coarse-estimated level means CM of the signal levels of the received read signal RS. The decoding stage 160 may then decode the first codeword C1 to provide first output data OD1. The first output data OD1 may be provided to the decision entity 130. Further, the decision entity 130 may receive the first codeword C1 and/or the coarse-estimated level means CM.

The decision entity 130 decides on using the fine detection stage 120 or not. If the decision entity 130 decides not to use the fine detection stage 120, the first output data OD1 may be output from the codeword detector 100. If the detection unit 130 decides to use the fine detection stage 120, the fine detection stage 120 may use the received read signal RS, the first output data OD1 and the coarse-estimated level means CM.

The fine detection stage 120 includes a fine level means estimation unit 121 and a fine codeword detection unit 122. The fine level means estimation unit 121 may be configured for a fine estimation of level means FM of the signal levels using vector-based minimum distance detection. The fine codeword detection unit 122 may be configured for providing the second codeword C2 based on the fine estimated level means FM using a vector-based maximum likelihood criterion. The second codeword C2 output by the fine codeword detection means 122 may be decoded by the decoding stage 160 to second output data OD2.

Recapitulating, the codeword detector 100 of FIG. 4 is configured to output the first output data OD1 for the case that the decision entity 130 decides to use only the coarse detection stage 110 and to output the second output data OD2 for the case that the deciding entity 130 decides to use both the coarse detection stage 110 and the fine detection stage 120.

Figure 5:
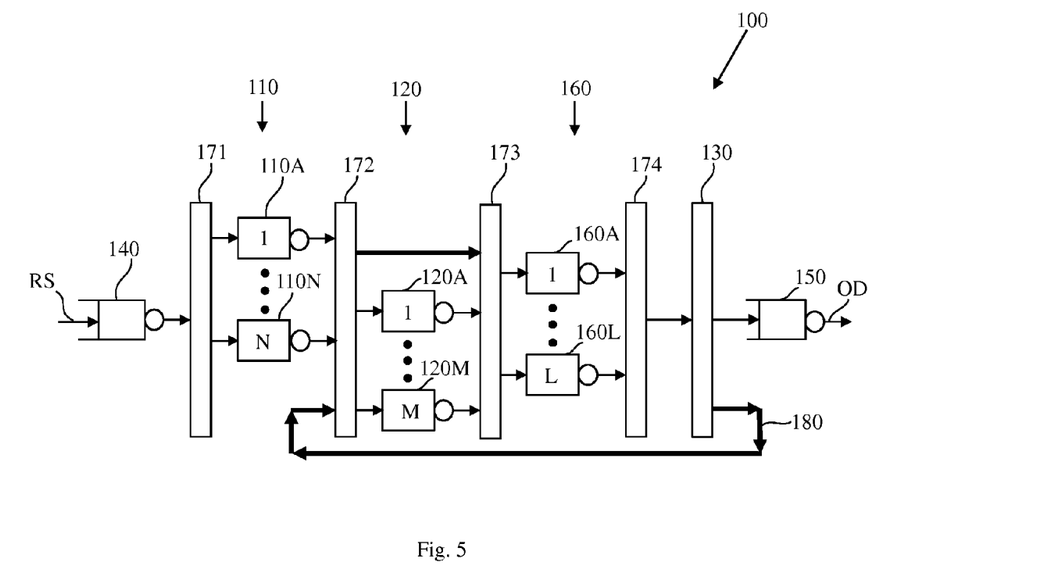
FIG. 5 shows a schematic block diagram of a third embodiment of a multi-stage codeword detector.

FIG. 5 shows a schematic block diagram of a third embodiment for a multi-stage codeword detector 100 for detecting codewords from read signals RS received from a multi-level memory device 200. The multi-stage codeword detector 100 of FIG. 5 includes an input buffer 140, a coarse detection stage 110, a fine detection stage 120, a decoding stage 160 and an output buffer 150 for outputting output data OD.

The input buffer 140 is configured to buffer the read signals RS received from the multi-level memory device 200. The coarse detection stage 110, the fine detection stage 120 and the decoding stage 160 are coupled between the input buffer 140 and the output buffer 150. The coarse detection stage 110 is connected between a first buffer 171 which is connected to the input buffer 140 and a second buffer 172 which is connected to the fine detection stage 120 and to the decoding stage 160. The coarse detection stage 110 includes N parallel arranged coarse detection units 110A-110N for coarse detection of N first codewords C1 from N received read signals RS. Thus, the coarse detection stage 110 may process N received read signals RS for outputting N first codewords C1 in parallel.

The fine detection stage 120 is connected between the second buffer 172 and a third buffer 173 connected to the decoding stage 160. The fine detection stage 120 includes M parallel arranged fine detection units 120A-120M for a fine detection of M second codewords C2 from M received read signals RS. Thus, the fine detection stage 120 is adapted process M received read signals RS for the fine detection in parallel.

Moreover, the decoding stage 160 is connected between the third buffer 173 and a fourth buffer 174. The decoding stage 160 includes L parallel arranged decoding units 160A-160L for decoding L codewords C1, C2 into L data words OD.

The decision entity 130 may be coupled between the fourth buffer 174 and the output buffer 150. The decision entity 130 decides if for a respective read signal RS only the coarse detection stage 110 has to be used or the coarse detection stage 110 and the fine detection stage 120 have to be used. If the decision entity unit 130 decides to use the fine detection stage 120, a feedback loop 180 is used respective received read signal RS is also processed by the fine detection stage 120.

Figure 6:
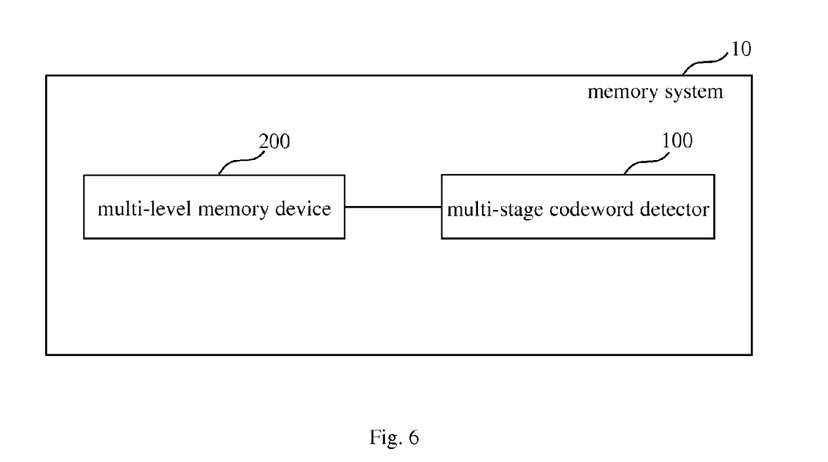
FIG. 6 shows a schematic block diagram of an embodiment of a memory system including a multi-level memory device and a multi-stage codeword detector.

In FIG. 6, a schematic block diagram of an embodiment of a memory system 10 including a multi-level memory device 200 and a multi-stage codeword detector 100 is shown. Examples for such a multi-stage codeword detector 100 are given in FIGS. 1 to 3. An example for a multi-level memory device 200 is shown in reference [8].

Figure 7:
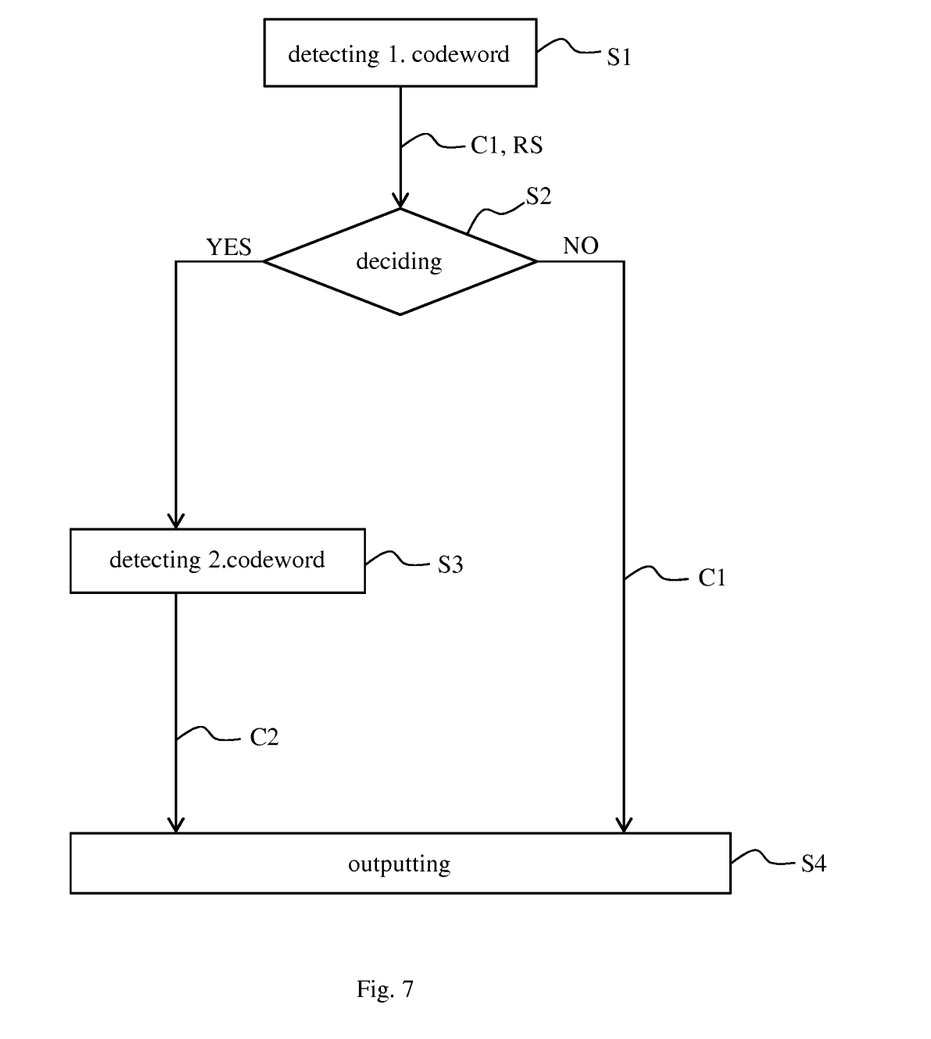
FIG. 7 shows an embodiment of a sequence of method operations for operating a multi-stage codeword detector.

FIG. 7 shows an embodiment of a sequence of method operations for operating a multi-stage codeword detector 100 for detecting codewords C1, C2 from read signals RS received from a multi-level memory device 200. The multi-stage codeword detector 100 includes a coarse detection stage 110 and a fine detection stage 120. Examples for the multi-stage codeword detector 100 are given in FIGS. 1 to 3.

In operation S1, a first codeword C1 is detected from a received read signal RS by the coarse detection stage 110.

In operation S2, it is decided on using the fine detection stage 120 for the received read signal RS in dependence on a reliability indicator RI indicating a certain reliability level of the received read signal RS. If it is decided not to use the fine detection stage 120, the first codeword C1 is used as output data. If it is decided to use the fine detection stage 120, the method proceeds with operation S3.

In operation S3, a second codeword C2 is detected from the received read signal RS by the fine detection stage 120.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 801, partly thereon, partly on a unit 801 and another unit 801, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGN LIST

10 memory system
100 codeword detector
110 first detection stage (coarse detection stage)
110A-110N coarse detection unit
111 coarse level means estimation unit
112 coarse codeword detection unit
120 second detection stage (fine detection stage)
120A-120M fine detection unit
121 fine level means estimation unit
122 fine codeword detection unit
130 deciding entity
140 input buffer
150 output buffer
160 decoding stage
160A-160L decoding unit
171 first buffer
172 second buffer
173 third buffer
174 fourth buffer
180 feedback loop
201, 201 error rate curve
301, 301 processing rate curve
C1 first codeword
C2 second codeword
CM coarse-estimated level means
ER error rate
FM fine-estimated level means
OD output data
OD1 first output data
OD2 second output data
p probability
PR processing rate
RI reliability indicator
RS read signal
S1-S4 method operation
t time
Th1, Th2 error rate threshold

REFERENCES

[1] B. Ricco et al., Proc. IEEE, vol. 86, no. 12, 1998
[2] H. Wong et al., Proc. IEEE, vol. 98, no. 12, 2010

[3] W.-C. Chien et al., IEDM 2011
[4] D. Ielmini et al., APL 96, 2010
[5] N. Papandreou et al., IEEE IMW 2011
[6] G. Dong et al. IEEE TCAS-I, vol. 58, no. 2, 2011
[7] UK Patent Application No. 1203496.3, filed on Feb. 29, 2012
[8] UK Patent Application No. 13166082.1

The invention claimed is:

1. A multi-stage codeword detector for detecting codewords from read signals received from a multi-level memory device, the multi-stage codeword detector comprising:
a first detection stage configured for a coarse detection of a first codeword from a received read signal;
a second detection stage configured for a fine detection of a second codeword from the received read signal;
a deciding entity configured to decide on using the second detection stage for the received read signal in dependence on a reliability indicator indicating a certain reliability level of the received read signal; and
an input buffer for buffering the read signals received from the multi-level memory device;
wherein the first detection stage is connected between a first buffer connected to the input buffer and a second buffer connected to the second detection stage, and wherein the first detection stage includes N parallel arranged coarse detection units for coarse detection of N first codewords from N received read signals.

2. The multi-stage codeword detector of claim 1, wherein the deciding entity is configured to forward the first codeword after a decoding to an output buffer if the reliability indicator indicates that the reliability level of the received read signal is higher than a certain reliability threshold, and to forward the received read signal to the second detection stage, if the reliability indicator indicates that the reliability level of the received read signal is less than or equal to the certain reliability threshold.

3. The multi-stage codeword detector of claim 1, wherein the first detection stage includes a coarse level means estimation unit configured for a coarse estimation of level means of level signals of the received read signal and a coarse codeword detection unit for providing the first codeword based on the coarse-estimated level means of the signal levels.

4. The multi-stage codeword detector of claim 3, wherein the coarse level means estimation unit is configured to use least squares or ordered statistics for the coarse estimation of the level means of the signal levels of the received read signal.

5. The multi-stage codeword detector of claim 3, wherein the coarse codeword detection unit is configured to use a vector-based minimum distance criterion for providing the first codeword based on the coarse-estimated level means of the signal levels of the received read signal.

6. The multi-stage codeword detector of claim 3, wherein the second detection stage is configured to provide the second codeword from the received read signal using the received read signal and the coarse-estimated level means provided by the coarse level means estimation unit.

7. The multi-stage codeword detector of claim 1, wherein the second detection stage includes a fine level means estimation unit configured for a fine estimation of level means of the signal levels using vector-based minimum distance detection and a fine codeword detection unit for providing the second codeword based on the fine estimated level means using a vector-based maximum likelihood criterion.

8. The multi-stage codeword detector of claim 1, wherein the first detection stage, the second detection stage and a decoding stage are coupled between the input buffer and an output buffer.

9. The multi-stage codeword detector of claim 1, wherein the second detection stage is connected between the second buffer and a third buffer connected to the decoding stage, and the second detection stage includes M parallel arranged fine detection units for a fine detection of M second codewords from M received read signals.

10. The multi-stage codeword detector of claim 9, wherein:
the decoding stage is connected between the third buffer and a fourth buffer connected to the output buffer; and
the decoding stage includes L parallel arranged decoding units for decoding L codewords into L datawords.

11. The multi-stage codeword detector of claim 1, wherein the reliability indicator includes a signal processing information indicating a certain noise level of the received read signal, in particular the noise level or an error rate of the received read signal, a number of cycles of the multi-level memory device and/or a temperature level of the multi-level memory device.

12. A memory system, comprising:
a multi-level memory device including a plurality of memory chips configured to store data; and
a multi-stage codeword detector configured to detect codewords from read signals received from the multi-level memory device, the a multi-stage codeword detector comprising a first detection stage configured for a coarse detection of a first codeword from a received read signal, a second detection stage configured for a fine detection of a second codeword from the received read signal, a deciding entity configured to decide on using the second detection stage for the received read signal in dependence on a reliability indicator indicating a certain reliability level of the received read signal, and an input buffer for buffering the read signals received from the multi-level memory device;
wherein the first detection stage is connected between a first buffer connected to the input buffer and a second buffer connected to the second detection stage, and wherein the first detection stage includes N parallel arranged coarse detection units for coarse detections of N first codewords from N received read signals.

13. The memory system of claim 12, wherein the deciding entity is configured to forward the first codeword after a decoding to an output buffer if the reliability indicator indicates that the reliability level of the received read signal is higher than a certain reliability threshold, and to forward the received read signal to the second detection stage, if the reliability indicator indicates that the reliability level of the received read signal is less than or equal to the certain reliability threshold.

14. The memory system of claim 12, wherein the first detection stage includes a coarse level means estimation unit configured for a coarse estimation of level means of level signals of the received read signal and a coarse codeword detection unit for providing the first codeword based on the coarse-estimated level means of the signal levels.

15. The memory system of claim 14, wherein the coarse level means estimation unit is configured to use least squares or ordered statistics for the coarse estimation of the level means of the signal levels of the received read signal.

16. The memory system of claim 14, wherein the coarse codeword detection unit is configured to use a vector-based minimum distance criterion for providing the first codeword based on the coarse-estimated level means of the signal levels of the received read signal.

17. The memory system of claim 14, wherein the second detection stage is configured to provide the second codeword from the received read signal using the received read signal and the coarse-estimated level means provided by the coarse level means estimation unit.

18. The memory system of claim 12, wherein the second detection stage includes a fine level means estimation unit configured for a fine estimation of level means of the signal levels using vector-based minimum distance detection and a fine codeword detection unit for providing the second codeword based on the fine estimated level means using a vector-based maximum likelihood criterion.

* * * * *